United States Patent [19]
Spaggiari

[11] Patent Number: 5,979,237
[45] Date of Patent: Nov. 9, 1999

[54] METHOD FOR MOTOR VEHICLE WHEEL BALANCING

[75] Inventor: Giuliano Spaggiari, Correggio, Italy

[73] Assignee: G.S. S.r.l., Correggio, Italy

[21] Appl. No.: 09/015,060

[22] Filed: Jan. 28, 1998

[30] Foreign Application Priority Data

May 16, 1997 [IT] Italy .................................. MO97A0084

[51] Int. Cl.$^6$ ..................................................... G01M 1/32
[52] U.S. Cl. ................................................................ 73/462
[58] Field of Search ..................... 73/462, 470; 301/5.21;
364/528.14; 701/124

[56] References Cited

U.S. PATENT DOCUMENTS

| | | | |
|---|---|---|---|
| 4,357,832 | 11/1982 | Blackburn et al. | 73/462 |
| 4,442,712 | 4/1984 | Junck et al. | 73/462 |
| 4,545,021 | 10/1985 | Suzuki et al. | 364/571 |
| 4,879,792 | 11/1989 | O'Conner | 29/156.4 |
| 5,350,220 | 9/1994 | Atwell, Jr. | 301/5.21 |
| 5,591,909 | 1/1997 | Rothamel et al. | 73/462 |

*Primary Examiner*—John E. Chapman
*Attorney, Agent, or Firm*—Browdy and Neimark

[57] ABSTRACT

The invention relates to a method for balancing motor vehicle wheels having rims formed by continuous radially-directed tracts alternating with spaces, according to which, after having a first time determined an amount and exact geometrical position of correction weights, a method employing the following phases is applied: a) application of a weight, whose position on the rim and amount are theoretically exact and calculated by the processor after the start phase: the weight being applied at a spoke 12 situated at a position on the rim which is closest possible to an exact position, if there is no spoke 12 at the exact position; b) determination of the effective position at which the weight has been materially applied with respect to the exact position as calculated by the processor; c) the use of geometric parameters defining the effective position in order to calculate the residual unbalance deriving from the new real configuration of the weights so that a theoretically-calculated exact geometrical position of a new weight to be applied can be carried out; d) comparison between the value of residual value and a value assigned as acceptable; e) application, in the case in which said residual unbalance is greater than the assigned value, of the second weight at the continuous tract or spoke 12 of the rim which is closest to the theoretically exact geometric position identified in the previous phase (c, that is, if said exact position is not already at a spoke 12; f) repetition of phases b), c), d), e) up until when the value of the nth residual unbalance calculated is lower than or equal to the value assigned as acceptable.

1 Claim, 1 Drawing Sheet

METHOD FOR MOTOR VEHICLE WHEEL BALANCING

BACKGROUND OF THE INVENTION

The invention relates to a method for balancing the wheels of motor vehicles, applicable on wheels having rims consisting of a hub and a circular peripheral part supported by alternate radial struts or spokes and gaps.

Balancing systems normally used in balancing machines are characterised in that unbalance on each correction plane is compensated by applying a weight in a diametrically opposite position to the angular position of the unbalance. This operation, as is well known, comprises the input of data necessary for identifying the correction plane or planes, a calculation of the forces due to unbalance using transducers of forces applied on the shaft the wheel is mounted on, and the processing of the transducer signals with the aim of obtaining the amount and geometrical arrangement on the wheel of the masses or weights needed to correct the unbalance.

According to the type of wheel, the operator can decide whether to perform a correction of the unbalance on a single plane or on more than one.

The correction of the unbalance on one plane only enables correction of only the static unbalance responsible for the "shimmying" of the wheel.

Normally unbalance correction is carried out on two planes, thus compensating both the effects of static and dynamic unbalance.

For practical purposes, in the case of steel rims, the planes are chosen in the proximity of the edges of the rim, so that the correction of the unbalance happens by means of the application of weights provided with a steel spring which easily couples with the edge of the rim thanks to the use of a plierhammer tool.

In the case of light alloy rims, for reasons connected with the shape of the edge or even for aesthetic reasons, normally self-adhesive weights are used.

The majority of balancers include special functions for the gathering of balancing data in cases where the weights to be used are self-adhesive or a combination of these and other weights to be fixed to the alloy rim edge.

These setting functions take account of the fact that the center of gravity of the adhesive weights is not close to the edge of the rim but rather in a position identified using fixed correction parameters with respect to said rim.

The balancing planes setting function is especially utilized, as it enables a correction of the unbalance by means of the application of adhesive weights applied to the inside of the rim, so that once the wheel is mounted they will not be visible.

Some balancers equipped with special automatic functions allow for an exact diameter feeler reading and a correction plane axial position to be inputted in order to calculate correct positioning and rim application of the self-adhesive weights.

All the above-mentioned prior art realizations have in common the fact that, while it is the operator who defines the position of the correction planes, that is, the diameter and the axial position the weights will be applied at, it is the machine programmer who defines the angular position they will be applied at. These realizations cannot be used to carry out the wheel balancing operation on spoked wheels, that is, wheels which have a centering hole and the bolt holes in a central part which is connected to the rim, housing the tire beads, by means of alternated tracts of spokes or struts and gaps.

For these rims, which are usually made of light alloys, it is usually preferable to put the weights on the inside of the rim, so that they are invisible, being hidden behind a spoke or strut.

Traditional balancers do not guarantee that a weight will be positioned behind the spokes of such a wheel; indeed, the fewer struts there are on the wheel, the greater the probability that the weights will have to be visible, even though they are on the inside of the rim.

In an attempt to overcome this problem, since the 1980s the balancing industry has been using a method which vectorially decomposes the unbalance in two predetermined directions.

This method enables the weight of two weights to be calculated to be applied in two predetermined angular positions (and not coinciding with the position of the detected unbalance), with those two predetermined positions being decided on the basis of where there is material to support the weight.

For example, in the case of axial ventilator balancing, the possible directions correspond with the axes of the rotor blades. This situation is demonstrated, for example, in U.S. Pat. No. 4,357,832, where, in column 8, line 58, the following is stated: "In certain cases, there may be only certain tapped holes equally spaced around the rotor into which correction weights can be threaded. Similarly, in the case of a bladed turbine, for example, the correction weight will have to be added to one of the blades since it cannot be supported in the space between them. The correction vector, however, may be located in-between blades or in-between tapped holes. In this case, it is desirable to resolve this single vector into two vectors which intersect the blades or the tapped holes."

In European Patent no. 95196735.4 a similar unbalance decomposition method is described, in the which the angular positions of the radially-directed parts of the disc of the wheel are memorized and the correction weight is discomposed into two weights, to be applied at the continuous part of the wheel.

All of the above-described methods for vectorial decomposition of unbalance require a prior identification of the zones which can be used as directrices of the vector unbalance or the identification and memorization of the angular position of the material interruptions and/or the continuous radially-directed parts of the wheel disc.

In the very frequent case in which there is a much higher percentage of continuous surface in relation to empty surface, the probability that the weight will have to be applied to a continuous zone is also higher, rendering the use of vectorial decomposition with a previous memorization of the angular positions of the parts of the continuous radially-directed wheel disc a very laborious method.

SUMMARY OF THE INVENTION

The present invention, as it is characterized in the claims that follow, obviates the drawbacks and limits in the known realizations by providing a motor vehicle wheel balancing method according to which the correction of unbalance for each balancing plane is carried out by successive iterations, without having to set the wheel shaft in rotation after the first rotation, but calculating and applying to the rim, for each iteration, a weight at an angular portion corresponding to the continuous radial tract closest to the calculated theoretical portion, up until an unbalance value is reached which is lower than or equal to an assigned value.

An advantage of the invention is that it does not require a previous memorization of the angular positions of the material interruptions and/or of the continuous radially-directed parts of the rim.

BRIEF DESCRIPTION OF THE DRAWINGS

Further characteristics and advantages of the present invention will better emerge from the detailed description that follows of a preferred but non-exclusive embodiment of the invention, illustrated purely by way of non-limiting example in the accompanying figures of the drawings, in which.

DESCRIPTION OF THE PREFERRED EMBODIMENTS

Figure 1:
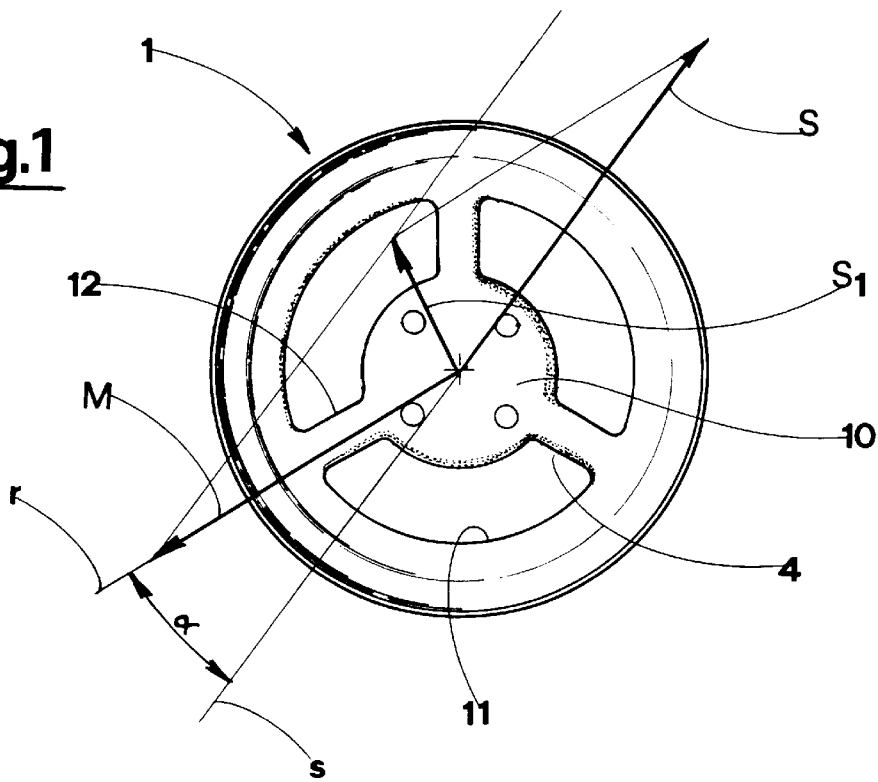
FIGS. 1 and 2 show a schematic frontal view of a wheel to be balanced, in which the mathematical and geometric elements are evidenced, which elements are used in the application of the balancing method of the invention.
Figure 2:
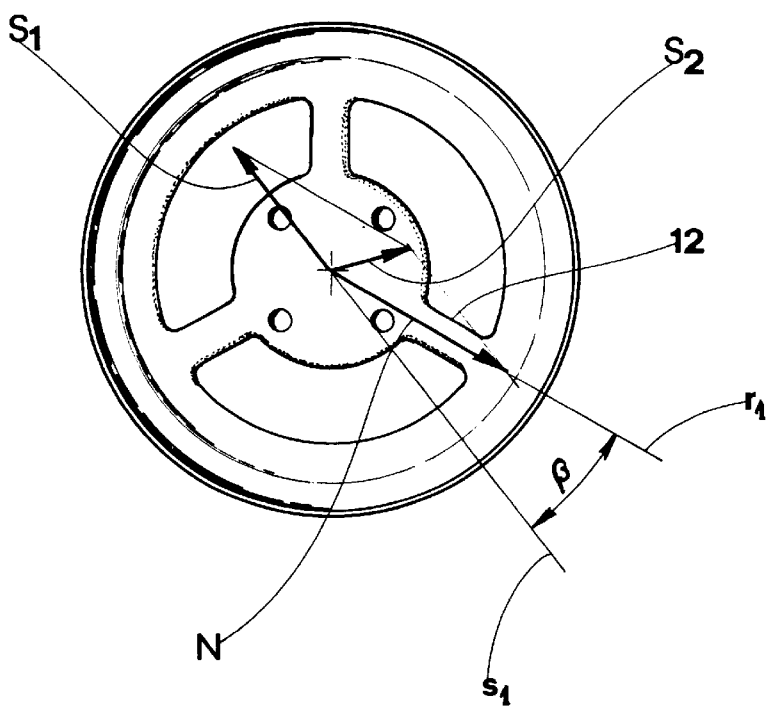

The method for balancing vehicle wheels according to the present invention is applicable on wheels 1 provided with rims or discs formed by a hub 10 and a circular peripheral part 11, which are connected by continuous radially-directed tracts or spokes 12, alternated with interruptions of material or empty spaces. The invention comprises, initially, a phase of mounting said wheel on a rotating shaft, provided with special means for axing the wheel 1; memorizing the data necessary for defining either the correction plane or planes; setting in rotation the shaft of the wheel 1 which is mounted on the shaft (start phase); reading off the forces due to any unbalance manifested during motion (start phase) by means of a sensor device operating using transducers of said forces; stopping the shaft; processing the signals provided by said transducers by means of a computer, in order to produce an indication of the amount and geometrical arrangement of rim-mounted weights needed to correct any unbalance calculated.

For correction on each correction plane, the method includes the following phases, in order:

a) application of a weight, whose position on the rim and amount are theoretically exact and calculated by the processor after the start phase: said weight will be applied at a continuous part or a spoke 12 situated at a position on the rim which is closest possible to an exact position, obviously if there is no spoke or continuous part at said exact position;

b) determination of the effective position at which the weight has been materially applied with respect to the exact position as calculated by the processor;

c) the use of geometric parameters defining said effective position in order to calculate the residual unbalance deriving from the new real configuration of the weights so that a theoretically-calculated exact geometrical position of a new weight to be applied can be carried out;

d) comparison between the value of said residual value and a value assigned as acceptable;

e) application, in the case in which said residual unbalance is greater than said assigned value, of said second weight at said continuous tract or spoke 12 of the rim which is closest to the theoretically exact geometric position identified in the previous phase c), that is, if said exact position is not already at a spoke or continuous tract 12;

f) the repetition of phases b), c), d), e) up until when the value of the nth residual unbalance calculated is lower than or equal to said value assigned as acceptable.

In more detail, with specific reference to said phase a), should the angular position of the weight to be applied in order to compensate the unbalance not correspond to a continuous zone or, more simply, a spoke 12, of the rim, the application of said weight at the nearest continuous zone or spoke 12 does not produce, obviously, the desired correction. Indeed, if S denotes the unbalance vector read off after the wheel 1 is rotated, in order to compensate, a weight of predetermined entity would have to be applied to the wheel 1 which would, by effect of the rotation, generate an equal and opposite vector, denoted with s, to S located on a same line of action as S.

The application of said weight to a line r instead of s, with r corresponding to a spoke 12 (i.e. at a point where the weight can be attached), does not produce correction of the initial unbalance S, even though it generates, by effect of the rotation, a vector M having the same value as S, but not the same direction, as it is angularly staggered with respect to S by an angle $\alpha$.

There remains a residual unbalance, represented by the residual unbalance vector $S_1$, which can easily be calculated without setting the wheel I in rotation again. This residual unbalance is given by the vector:

$S_1 = S + M$

Obviously, value $S_1$ is certainly less than value S.

Thus phase b) is initialized, which operatively consists in providing the processor with a confirmation signal of the geometric position at which the weight has been applied to the spoke 12. In other words, the value of angle $\alpha$, which the vector M forms with the line of action of the unbalance vector S, is entered into the processor.

With this information supplied, phase c) can be initiated, wherein the unbalance vector $S_1$ is calculated, relating to the new configuration and, consequently, the amount of a new weight to be applied in order to compensate said residual unbalance $S_1$.

In phase d) the value (module) of the residual unbalance $S_1$ is compared with a value Sa assigned as acceptable.

If the result is that $S_1 \leq Sa$, the balancing procedure can be considered completed.

If, on the other hand, $S_1$ is greater than Sa, the following phase is applied, phase e). Here, the new weight determined during the previous phase c) at the spoke 12 of the rim situated closest to the theoretically exact geometrical position calculated during phase c) is applied. The application of the new weight gives rise to a new vector N which has the same value as $S_1$, but is angularly staggered with respect to the line of action of the latter, by an angle $\beta$.

In this case too, the application of the new weight on line $r_1$ instead of on line of action $s_1$ of the unbalance vector $S_1$, interesting a spoke 12 of the wheel 1 (that is, where there is material and a weight can actually be applied) does not produce a correction of unbalance vector $S_1$, even though it generates, by effect of the rotation, a vector N which has the same value as $S_1$, but not the same direction, as it is angularly staggered with respect to $S_1$ by an angle $\beta$. A residual unbalance remains, represented by the residual unbalance vector $S_2$, which can easily be calculated without newly rotating the wheel 1. This residual unbalance is given by vector:

$S_2 = S_1 + N$

One notes immediately that the value of $S_2$ is surely less than that of $S_1$. This means that the iterative procedure carried out is converging.

If $S_2 \leq Sa$, the balancing procedure is completed.

If, on the other hand, $S_2$ is greater than Sa, phases b), c), d), e) are repeated up until the value of the nth residual unbalance calculated is lower than or equal to said assigned value Sa.

Considering that the number of spokes 12 is normally either equal to or more than 3, that the angular disposition thereof is regular and that the spokes themselves always have a certain angular extension, the angular error is always less than $\pi/3$, thus the residual unbalance vector has a value which diminishes at each iteration. The iterative process is thus always convergent.

Experience has taught that normally within two or three iteration an unbalance value is obtained which is lower than what is considered acceptable.

Naturally the described method is applicable to the various correction planes.

What is claimed:

1. A method for motor vehicle wheel balancing, applicable to wheels having rims composed of a hub and a circular peripheral part joined together by radially-directed continual spokes alternating with spaces and comprising the phases of: mounting a said wheel on a rotating shaft provided with special wheel fixing means; memorizing data necessary for defining correction planes; setting said rotating shaft and said wheel in rotation; quantifying forces due to any unbalance manifested during said rotation through a sensor operating by means of transducers of said forces; stopping said shaft; processing signals provided by said transducers by means of a processor; results of said processing providing an indication of an amount and geometric disposition of weights to be applied to said rim in order to correct said any unbalance manifested, wherein in order to compensate for any unbalance manifested on any correction plane, a method following phases as listed below is employed:

a) application of a weight, whose position on the rim and amount are theoretically exact and calculated by the processor after the start phase: said weight being applied on a spoke situated at a position on the rim which is closest possible to an exact position, in absence of a spoke at said exact position;

b) determination of a true position at which the weight has been materially applied with respect to the exact position as calculated by the processor;

c) the use of geometric parameters defining said true position in order to calculate a residual unbalance deriving from a resulting new real configuration of the weights so that a theoretically-calculated exact geometrical position of a new weight to be applied can be carried out;

d) comparison between a value of said residual value and a value assigned as acceptable;

e) application, in the case in which said residual unbalance is greater than said assigned value, of said second weight at said spoke which is closest to the theoretically exact geometric position identified in previous phase c), if said exact position is not already at a spoke or continuous tract;

repetition of phases b), c), d), e) up until when a value of nth residual unbalance calculated is lower than or equal to a value assigned as acceptable.

* * * * *